Patented Mar. 10, 1931

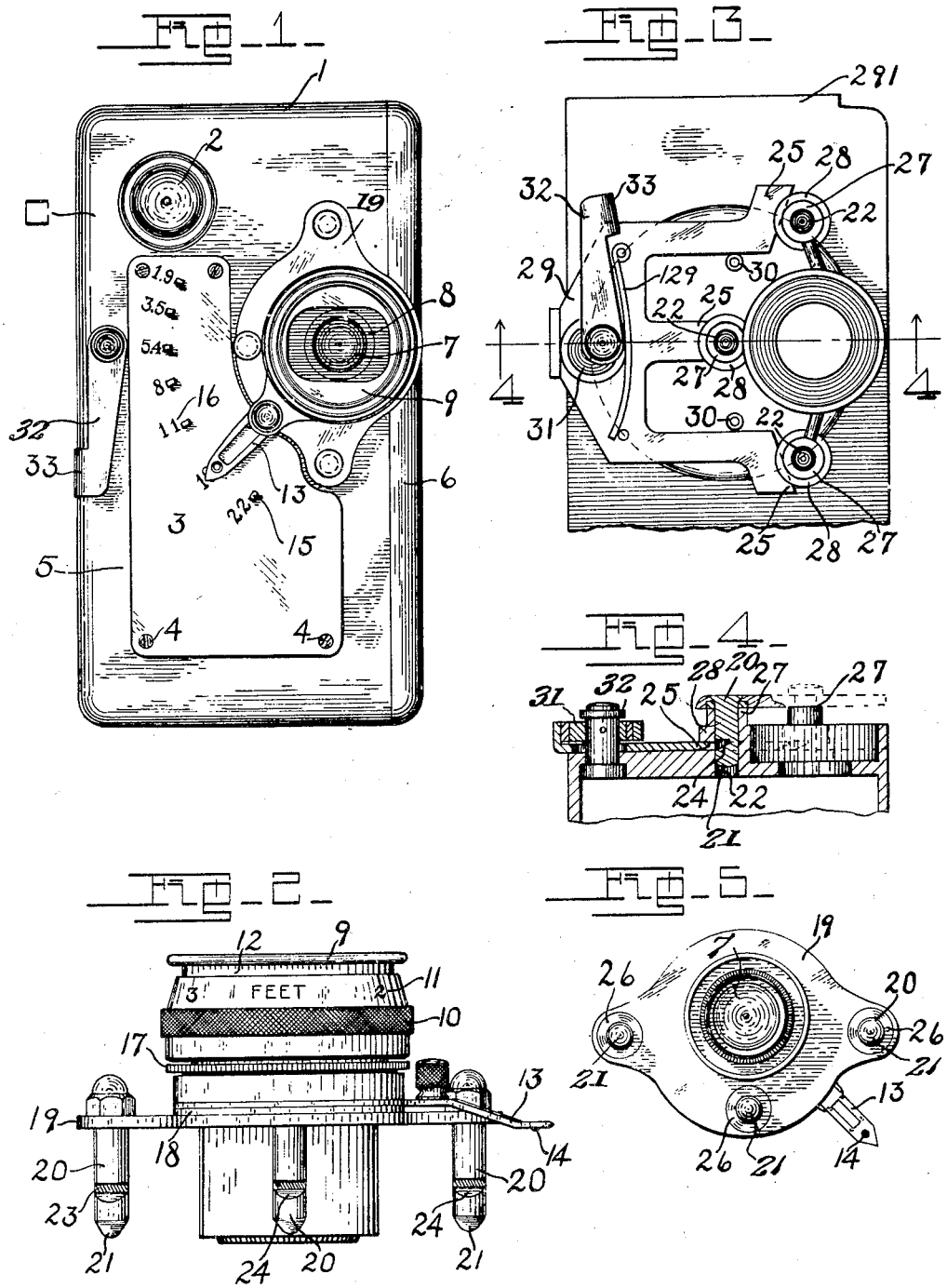

1,795,325

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

REMOVABLE MOUNT FOR OBJECTIVES

Application filed May 21, 1929. Serial No. 364,829.

This invention relates to photography and more particularly to mounts for photographic objectives adapted to be removably mounted upon a camera. One object of my invention is to provide a lens mount in which the objective may be accurately focused so that by placing the lens mount on a camera no further focal adjustment will be necessary. Another object of my invention is to provide a removable lens mount for objectives with a means for mounting on a camera which will insure extreme rigidity of the mount. Another object of my invention is to provide a lens mount having a plurality of accurately formed mount locating surfaces. Another object of my invention is to provide three mounting pins which are adapted for locating a mount upon a camera with the objective in accurate alignment with a film gate. Another object of my invention is to provide a mount having cam locking surfaces adapted to engage with complementary locking means on a camera and other objects will appear from the following specification, the novel features being particularly pointed out in the claims at the end thereof.

Coming now to the drawings wherein like reference characters denote like parts throughout;

Figure 1 is a front elevation of a camera equipped with a lens mount constructed in accordance with and embodying a preferred form of my invention;

Figure 2 is a side elevation of a lens mount embodying my invention removed from a camera;

Figure 3 is a plan view of a camera plate having an objective latching device, this plate being located inside the covering of the camera shown in Figure 1;

Figure 4 is a section on line 4—4 of Figure 3; and

Figure 5 is a bottom plan view of the lens mount shown in Figure 2 with the objective mounted therein.

In Patent Number 1,705,385 for Lens mount for cameras, issued March 12, 1929 in my name, there is shown a lens mount for cameras in which an objective is mounted on a removable base and that patent relates to the combination of a locking mechanism and removable objective mount. The present application relates to the lens mount per se.

As in the camera shown in the above mentioned patent the camera C may comprise a box 1 of any preferred shape having a finder lens 2 and a diaphragm plate 3 fastened by screws 4 to the front wall 5 of the camera. The camera is also provided with a cover 6 through which a film may be loaded into the camera in the usual manner.

An objective 7 may be carried in the usual cells 8 which lie inside of a hood 9 and a focusing knurled ring 10 is provided for adjusting the focus by bringing the foot scale 11 opposite a mark on the lens barrel 12.

The diaphragm may be adjusted by means of an arm 13 having a protuberance 14 adapted to snap into one of the series of notches 15 alongside of which there are numerals 16 designating the aperture of the lens. For the construction of the focusing lens mount reference may be had to my Patent Number 1,690,607 for Focusing objective mount for cameras issued November 6, 1928.

Coming now to the present invention, the objective 7 and its focusing mount designated broadly as 17 may be carried by an annular flange 18 which forms a part of a base 19, this base carrying a plurality of rods 20.

The rods 20 may be provided with rounded ends 21 to facilitate the insertion of these rods into apertures 22 as best shown in Figures 3 and 4. Each rod is provided with a slot 23, the sides of which lie in a non-parallel relation so that the lower wall 24 forms a cam surface against which a complementary cam surface as a wedge shaped cam 25 may operate to hold the lens mount in place.

The base plate 19 is provided with a plurality of accurately formed surfaces 26 here shown as lying adjacent or surrounding the post 20. These surfaces can conveniently be made by using an end mill so that they will lie in a plane although of course any method of rendering these surfaces accurate can be used.

The surfaces 26 must be of such a size and shape that they will form the sole contacting area which may lie against the accurately formed surfaces 27 which are provided on the ends of the tubular posts 28 carried by the camera plate 291.

The tops of these posts form a three point contact with the three areas 26 of the base 19 so that when these sets of areas are in contact the objective 7 will be held in the proper position.

In order to draw the areas 26 tightly against the areas 27 there is a cam locking plate designated broadly as 29, this plate being slidable past guiding posts 30 by means of a cam 31 which may be operated by a lever 32 having an operating handle 33 extending outside of the camera wall.

As fully described in the first mentioned patent the locking plate 29 can be moved against the pressure of a spring 129 to an operative position. When the lever 32 is moved to the position shown in Figure 1 the cam wedges 25 enter the slots and engage surfaces 24 of the pins 20 and firmly latch the objective into place. The action of the cams 25 on the complementary cams 24 is, of course, to draw down upon the posts 20.

This firmly attaches the removable mount on the camera. To release the mount it is only necessary to swing the operating handle 33 from the position shown in Figure 1 to that shown in Figure 3. This will permit the mount to be removed from the camera.

Having thus described my invention, what I claim as new and desire to secure by Letters Patent is:

1. In a lens mount for cameras, the combination with a base, of a plurality of protuberances projecting from the base, said protuberances being provided with wedge shaped surfaces.

2. In a lens mount for cameras, the combination with a base, of a plurality of rods extending from the base having slots therein, a wall of said slots being arranged angularly of the rod to form a cam surface.

3. In a lens mount for cameras, the combination with a base, a rod projecting from the base, said rod having a slot therein, the side walls of the slot lying in non-parallel relation.

4. In a lens mount for cameras, the combination with a base, three rods projecting from the base and having slots therein, side walls for the slots lying in non-parallel relation.

5. In a lens mount for cameras, the combination with a base, of a rod extending from the base, and an accurately formed area on said base, said area lying adjacent said rod.

6. In a lens mount for cameras, the combination with a base, of a plurality of rods extending from the base, and a plurality of accurately formed areas on the base adjacent said rods.

7. In a lens mount for photographic apparatus, the combination with a base, an annular flange on the base for supporting a focusing objective, a plurality of accurately formed areas on the base in definite relation to which said objective may be focused, said accurately formed areas being adapted to contact with photographic apparatus, and means to locate said lens mount on the photographic apparatus including a plurality of rods extending from the base.

8. In a lens mount for cameras having a latching mechanism and an accurately aligned apertured supporting surface, the combination with a base, of a plurality of projections on the base adapted to engage said apertures, accurately aligned surfaces carried by the base and wedge shaped surfaces on the projections adapted to be engaged by the camera latching mechanism to hold the mount on the base.

Signed at Rochester, New York, this 18th day of May 1929.

OTTO WITTEL.